(12) United States Patent
Pandraud et al.

(10) Patent No.: US 7,779,615 B2
(45) Date of Patent: Aug. 24, 2010

(54) DEVICE TO LOAD A SINTERING BOAT WITH NUCLEAR FUEL PELLETS AND LOADING METHOD USING SAID DEVICE

(75) Inventors: Jean-Luc Pandraud, Cavillargues (FR); Herve Sanchis, Les Angles (FR)

(73) Assignee: Areva NC, Paris (FR)

( * ) Notice: Subject to any disclaimer, the term of this patent is extended or adjusted under 35 U.S.C. 154(b) by 127 days.

(21) Appl. No.: 12/084,013

(22) PCT Filed: Oct. 20, 2006

(86) PCT No.: PCT/EP2006/067599

§ 371 (c)(1),
(2), (4) Date: Apr. 22, 2008

(87) PCT Pub. No.: WO2007/048751

PCT Pub. Date: May 3, 2007

(65) Prior Publication Data

US 2009/0142177 A1 Jun. 4, 2009

(30) Foreign Application Priority Data

Oct. 24, 2005 (FR) .................................. 05 53222

(51) Int. Cl.
*B65B 5/10* (2006.01)

(52) U.S. Cl. .............................. 53/475; 53/540; 53/541; 198/534; 193/32; 193/40

(58) Field of Classification Search ................... 53/475, 53/447, 531, 540, 541, 534, 543; 198/534, 198/540, 544; 193/32, 40
See application file for complete search history.

(56) References Cited

U.S. PATENT DOCUMENTS

| | | | | |
|---|---|---|---|---|
| 3,897,673 | A | * | 8/1975 | Kee et al. ........................ 53/496 |
| 4,332,120 | A | | 6/1982 | Haynes et al. |
| 4,566,835 | A | * | 1/1986 | Raymond et al. ......... 414/791.1 |
| 4,570,419 | A | | 2/1986 | Tinsley |
| 4,765,453 | A | | 8/1988 | Bucher |
| 4,807,734 | A | * | 2/1989 | Breeland et al. ............... 193/32 |
| 5,048,666 | A | * | 9/1991 | Huggins et al. .............. 198/431 |
| 5,871,078 | A | | 2/1999 | Arnarson et al. |
| 5,911,667 | A | | 6/1999 | Sanchis et al. |

(Continued)

FOREIGN PATENT DOCUMENTS

EP    0002875    7/1979

(Continued)

*Primary Examiner*—Thanh K Truong
(74) *Attorney, Agent, or Firm*—Nixon Peabody LLP

(57) ABSTRACT

Device to load a sintering boat with nuclear fuel pellets, comprising a loading chute (2) delimiting a travel pathway (4) for the pellets, the loading chute comprising an upper end (8) intended to receive pellets and a lower end (12) intended to lie close to a sintering boat, said loading chute (2) comprising gates (18, 20, 22) forming an obstacle in the pathway of the pellets so as to fractionate said pathway, said gates (18, 20, 22) able to be actuated alternately, and the lower end (12) of the loading chute being movable so that it can be drawn close to and away from a bottom part of the sintering boat.

A further subject-matter of the present invention is a method to load a sintering boat with nuclear fuel pellets, using a device according to the present invention.

18 Claims, 4 Drawing Sheets

U.S. PATENT DOCUMENTS 6,639,961 B2 * 10/2003 Bailey et al. ................ 376/268

FOREIGN PATENT DOCUMENTS

| | | |
|---|---|---|
| EP | 0300246 | 6/1988 |
| EP | 0385195 | 2/1990 |
| FR | 2764585 | 12/1998 |
| GB | 2197290 | 5/1988 |

* cited by examiner

DEVICE TO LOAD A SINTERING BOAT WITH NUCLEAR FUEL PELLETS AND LOADING METHOD USING SAID DEVICE

CROSS REFERENCE TO RELATED APPLICATIONS OR PRIORITY CLAIM

This application is a national phase of International Application No. PCT/EP2006/067599 entitled "DEVICE TO LOAD A SINTERING BOAT WITH NUCLEAR FUEL PELLETS AND LOADING METHOD USING SAID DEVICE", which was filed on Oct. 20, 2006, and which claims priority of French Patent Application No. 05 53222, filed Oct. 24, 2005.

TECHNICAL AREA AND PRIOR ART

The present invention mainly relates to a loading device to load a sintering boat with pellets of nuclear fuel, and to a loading method using said device.

Nuclear fuel pellets are made from a mixture of nuclear fuel powder e.g. a MOX powder (a mixture of plutonium oxide and uranium oxide). This powder is pressed in a press into cylindrical pellets which are then sintered in a furnace at a very high temperature under a controlled atmosphere. After sintering, the pellets are ready to be filled into cladding tubes to form nuclear fuel rods.

To conduct sintering of the pellets, they are loaded into containers, also called sintering boats which are arranged on skids; a skid train is then moved inside the sintering furnace. However, before sintering, these pellets are highly fragile and very frangible, and must be handled with precaution to reduce the occurrence of pellet chipping and to avoid damage to these pellets, since their size must be well controlled to ensure safe, efficient functioning of nuclear reactors. This therefore requires that the device for loading the sintering boats with nuclear fuel pellets is able to ensure impact-free loading, or at least reduced-impact loading.

From document EP-0 385 195 for example, a device is known to load a sintering boat with nuclear fuel pellets which comprises a loading chute arranged at the end of pellet feed means, this channel comprising a lower end intended to be arranged in the vicinity of the sintering boat, and also comprising a succession of flexible guide means intended to slow down the pellets as they fall under gravity. The feeding of the loading channel is conducted continuously, and the pellets therefore follow after one another in the loading channel and may knock against each other, thereby being susceptible to damage.

From document FR 2 764 585 an object transport device is also known comprising a shaft provided with fixed, superimposed strips, the strips being coated with a shock-absorbing material; the strips damp the fall of the objects in the shaft.

It is therefore a purpose of the present invention to provide a loading device to fill a sintering boat with nuclear fuel pellets, in which the risks of pellet damage are reduced.

It is a further purpose of the invention to provide a loading device to fill a sintering boat with nuclear fuel pellets which allows substantially uniform filling of the sintering boat.

It is also a purpose of the present invention to provide a device of simple design and operation.

DESCRIPTION OF THE INVENTION

The purposes set forth above are achieved by means of a loading device comprising a loading chute whose lower end can be moved close to and away from the bottom of a sintering boat, so as to bring the pellets as close as possible to the point where they are to be deposited, the loading chute also comprising alternately actuated gate systems to allow conveying of the pellets in a manner that is relatively little chaotic.

The subject-subject of the present invention is mainly a device to load a sintering boat with nuclear fuel pellets, which comprises a loading chute delimiting a travel pathway for the pellets, the loading chute comprising an upper end intended to receive pellets and a lower end intended to lie close to a sintering boat, said loading chute comprising gates that form an obstacle in the pathway of the pellets so that said pathway is fractionated, said gates able to be actuated alternately, and the lower end of the loading chute is able to be displaced so that it can be moved close to and away from a bottom part of the sintering boat.

In one advantageous example of embodiment, the device of the present invention comprises a single actuating means to actuate said gates.

The device may comprise an upper gate, an intermediate gate and a lower gate, the opening (closing) of the intermediate gate causing the closing (opening) of the lower and upper gates.

The actuating means comprise a cylinder for example linked to the intermediate gate via connecting rod means.

Advantageously, the upper and lower gates are linked by a coupling bar, and one of either the upper or lower gates is connected via gear means to the intermediate gate.

The gates are advantageously of substantially rectangular shape and comprise fringes on the side of a bottom part of the loading chute.

The gates are made in polyurethane for example.

The device of the invention may advantageously comprise a flexible flap at the lower end of the loading chute. The flap may be in a silicone material.

The feed means is a conveyor belt for example.

The device of the present invention advantageously comprises means to move the sintering boat relative to the lower end of the loading chute.

A further subject-matter of the present invention is a loading method using a device according to the present invention, consisting of:

positioning the lower end of the loading chute at the closest position to the bottom of the sintering boat,
setting in operation the pellet feeding means,
actuating the gates alternately,
lifting the lower end of the loading chute in relation to the thickness of the pellets arranged in the sintering boat.

The sintering boat can be moved during loading so as to ensure filling substantially in layers.

The loading method may follow the following cycle:
a first layer of pellets is deposited with the lower end of the feed head at a minimal position,
a second layer of pellets is deposited at a position higher than the minimal position,
a third and a fourth layer are deposited at an even higher position,
a fifth and sixth layer are deposited at an even higher position.

BRIEF DESCRIPTION OF THE DRAWINGS

The present invention will be better understood with the help of the following description and appended drawings, in which.

DETAILED DESCRIPTION OF PARTICULAR EMBODIMENTS

Figure 1:
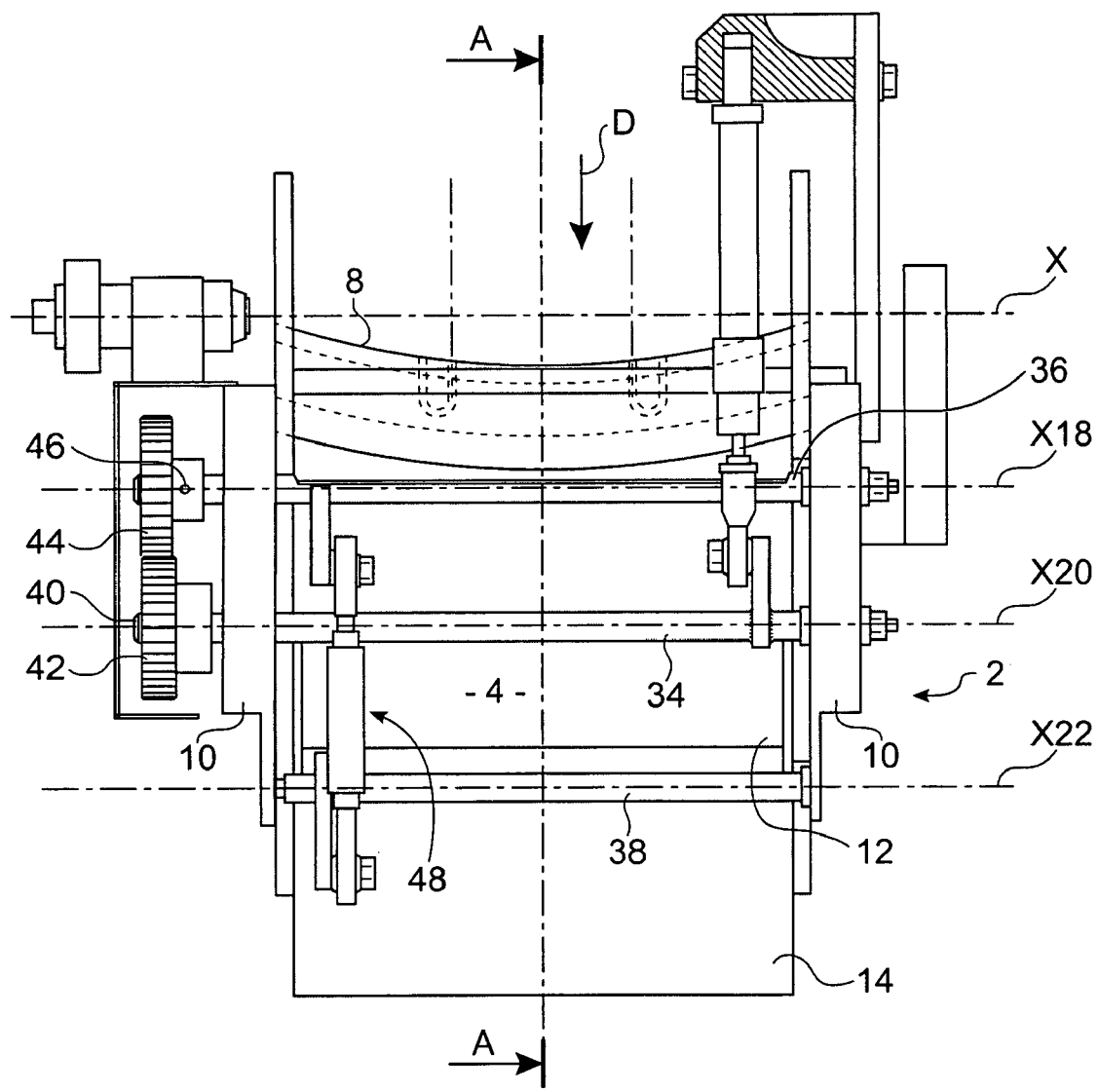
FIG. 1 is an overhead, partial section view of a loading device according to the present invention.
Figure 2:
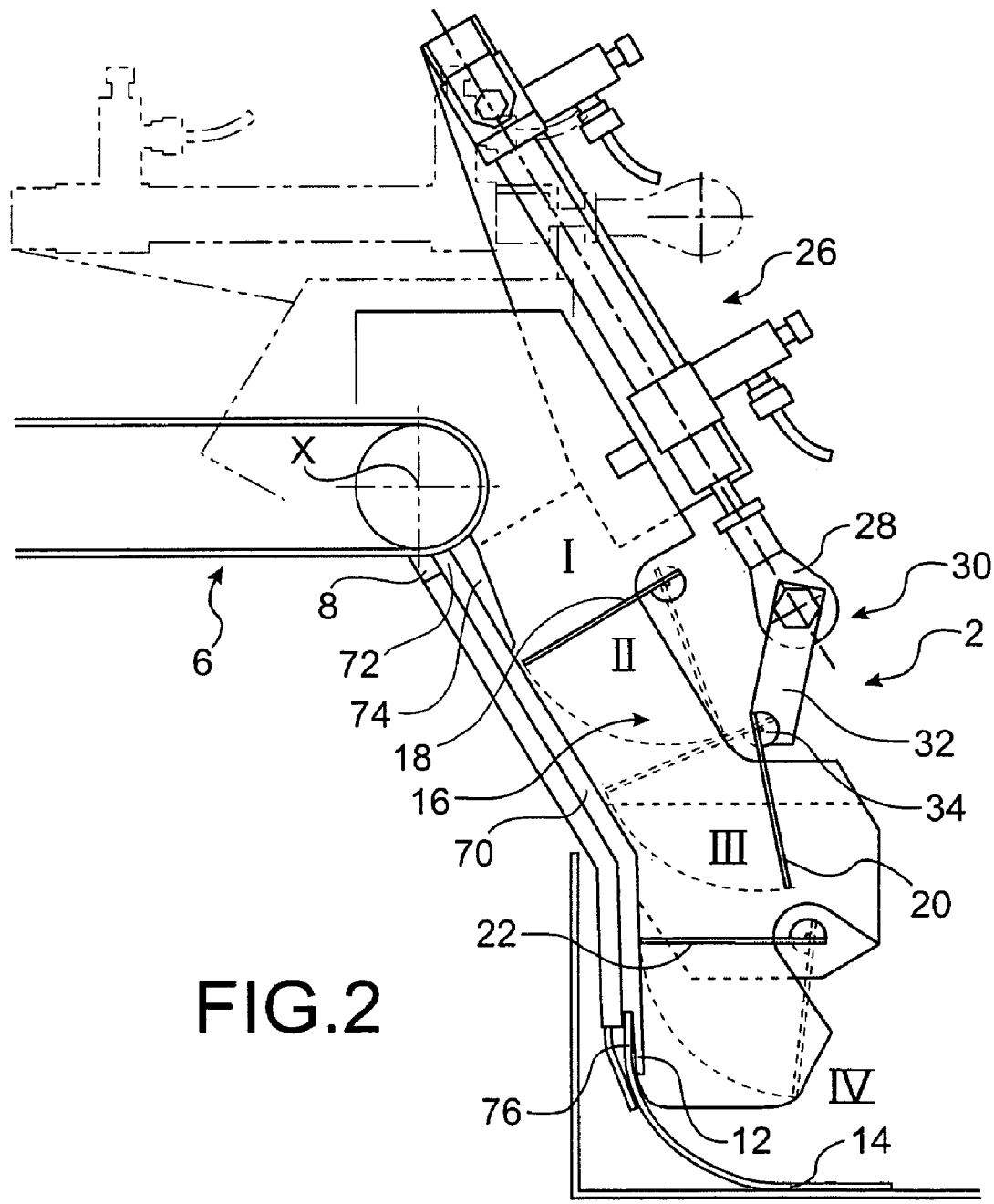
FIG. 2 is a cross-section along sectional plane AA of the device in FIG. 1.

In FIGS. 1 and 2, a loading device for sintering boat can be seen according to the present invention, comprising a loading chute 2 delimiting a travel pathway 4 for the pellets, fed by feed means 6 bringing the pellets to an upper end 8 of the loading chute 2. The loading chute 2 also comprises two side walls 10 laterally delimiting the travel pathway 4 and extending substantially from the upper end 8 of the loading chute to a lower end 12 of the loading chute.

Figure 5:
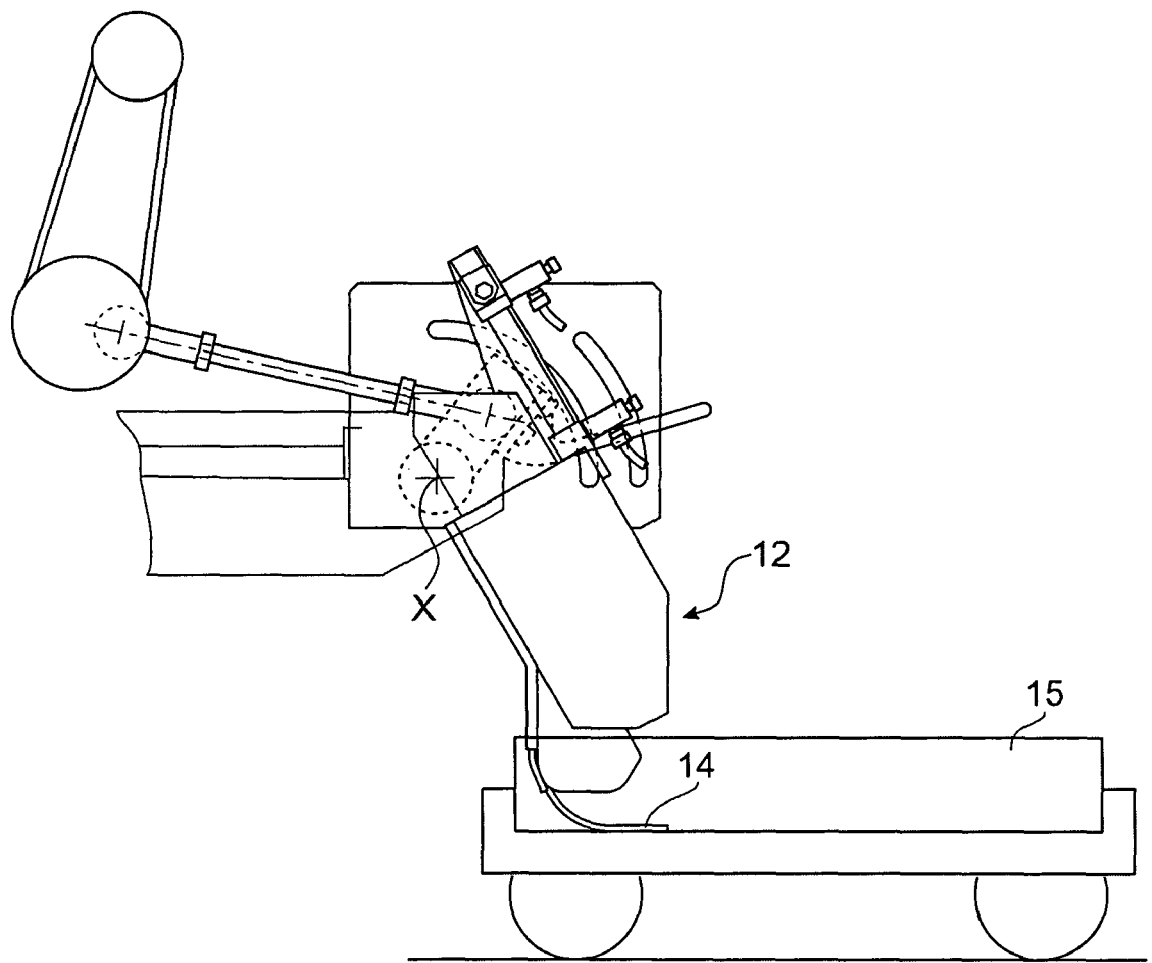
FIG. 5 is a side view of the device according to the invention.

The loading chute is advantageously extended by a flap 14 fixed to the lower end 12 of the loading chute 2, this flap is intended to lick the bottom part of a sintering boat 15 shown FIG. 5 to cushion the fall of the pellets.

According to the present invention, the loading chute is mobile in rotation about an axis X transverse to the direction of transfer D indicated by the arrow.

According to the present invention, the device also comprises means 16 to fractionate the flow of the pellets from the feed device 6 towards the sintering boat in order to reduce their speed and thereby limit risks of damage to said pellets.

These means 16, in the example shown, consist of three gates arranged one behind the other in the direction of flow D. Gates 18, 20, 22 are mobile in rotation about axes X18, X20, X22 respectively.

The gates 18, 20, 22 are of substantially rectangular shape and mobile in rotation about axes X18, X20, X22 along one of the sides of the gate, axes X18, X20, X22 being arranged at a determined distance from the travel pathway 4, substantially corresponding to the height of the gates 18, 20, 22.

The gates 18, 20, 22 are opened (closed) alternately to allow a pellet to pass from level I lying upstream of gate 18 towards level II delimited by gates 18 and 20, then towards level III delimited by gates 20 and 22, and finally towards level IV substantially corresponding to the sintering boat. Therefore the pellets are conveyed in four steps towards the sintering boat and risks of damage as they fall are substantially reduced.

Gates 18, 20, 22 are advantageously made in a flexible material e.g. polyurethane. Also, advantageously, with reference to FIG. 4, the gates 18, 20, 22 have fringes 24 at their lower end intended to lick the travel pathway 4. These fringes further slow the movement of the pellets when passing through the gates.

In the example shown, the gates 18 and 22 have the same position i.e. they are simultaneously open or simultaneously closed, whilst gate 20 is in reverse position to gates 18 and 22 i.e. it is open when gates 18 and 22 are closed, and it is closed when gates 18 and 22 are open.

In the example shown, actuation of the three gates is made by a single actuating mechanism 26 for simplification of the device and reliable providing of the desired actuation. However, provision may be made for example for a separate actuation mechanism for each of the gates, or for one mechanism for gates 18 and 22 and one mechanism for gate 20.

The actuation mechanism 26, in the example shown, comprises a hydraulic or pneumatic cylinder linked via one free end 28 to gate 20 by a connecting rod mechanism 30, thereby transforming the translational movement of the cylinder 26 into a rotational movement of the gate 20 about its axis X20.

The connecting rod mechanism 30 is formed by a bar 32 fixed rotatably mobile to the end 28 of the cylinder 26, and rigidly fixed to an upper end 34 of the gate 20.

The gate 20, as can be seen FIG. 1, is secured to a pin 34 forming the upper end of the gate, which is mounted rotatably mobile in the side walls 10 of the loading chute.

The gates 18 and 22 are also secured to a pin 36, 38 respectively, at their upper ends. Pins 36, 38 are mounted rotatably mobile via their longitudinal ends in the side walls 10, respectively of the loading chute.

Advantageously, the movement of gate 18 is coupled with movement of gate 20, and movement of gate 18 is coupled with movement of gate 22.

As can be seen FIG. 1, the mechanism transmitting movement between shaft 34 of gate 20 and shaft 36 of gate 18 is formed of a first gear 42 fixed in rotation to a longitudinal end 40 of the shaft 34, engaging with a second gear 44 fixed in rotation to an end 46 of shaft 36. Provision is also made to adjust the position of gates 18 and 20 so that when one is open, the other is closed.

Figure 4:
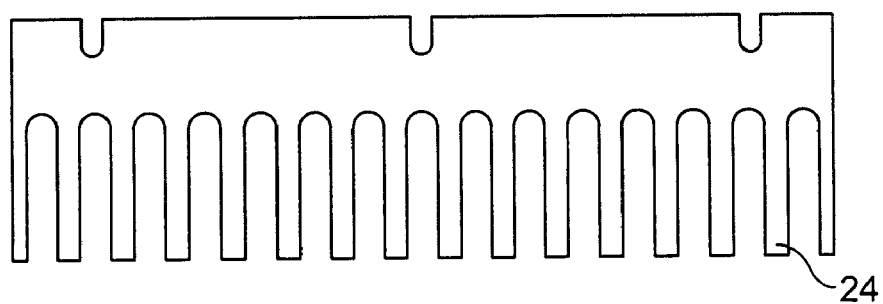
FIG. 4 is a plan view of an exemplary gate according to the present invention.

Pin 36 and pin 38 are connected by a coupling arm 48 which can be seen FIG. 4, which comprises an arm 50 rotatably connected via a first end 52 to shaft 36, and a second arm 54 rotatably connected via a first end 56 to shaft 38. Arms 50 and 54 comprise longitudinal ends 58, 60 lying respectively opposite longitudinal ends 52 and 56 and linked by the bar 48, the ends 58 and 60 being freely mounted in rotation in the longitudinal ends of the bar 48.

Advantageously, the bar 48 is formed of a stretching screw (not shown) used to adjust the relative position of gates 18 and 22. As can be seen FIG. 3, gates 18 and 22 advantageously are not arranged parallel to one another, but gate 22 lies slightly further back than gate 18, this arrangement reducing the pathway of a pellet in the space delimited between gates 18 and 22, thereby reducing risks of damage to the pellet.

Provision may be made to couple gate 20 with gate 22, instead of gate 20 with gate 18.

Additionally, provision may be made to actuate one of gates 18, 22 by means of the cylinder and to couple it with gate 20, in similar manner to that previously described.

Also, it is possible to make provision for more than three gates depending on the length of the loading chute and on the maximum desired speed at which the pellets fall along the loading chute.

Figure 3:
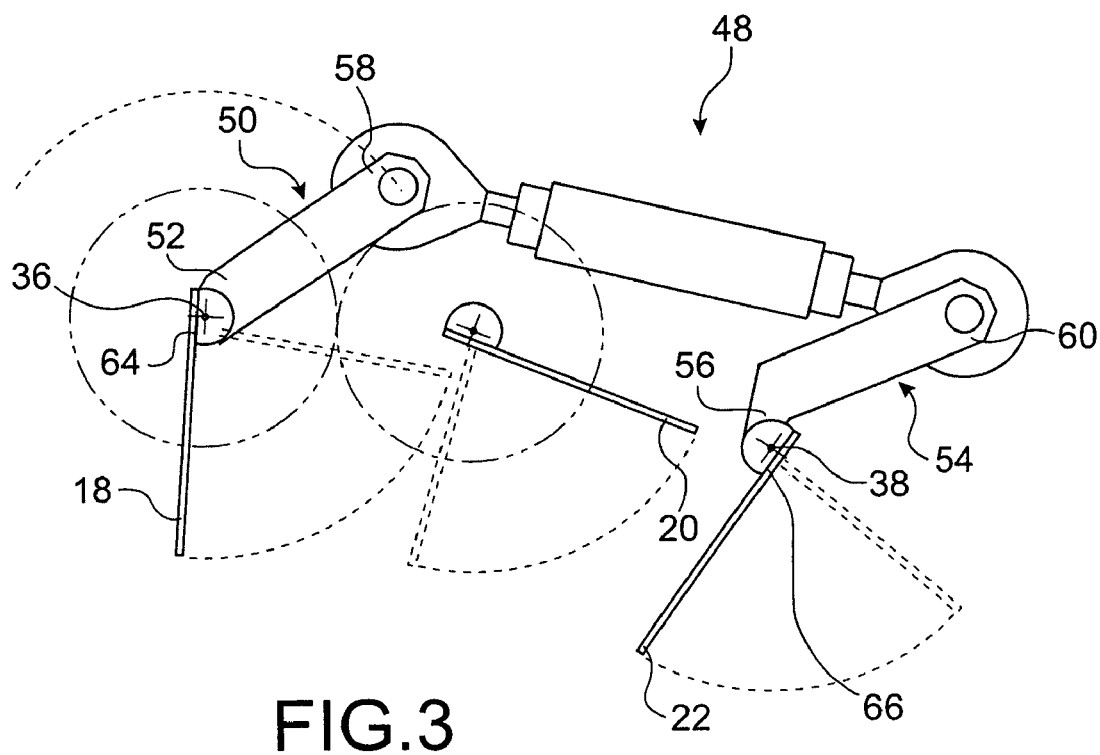
FIG. 3 is a cross-section along sectional plane BB of the device in FIG. 1.

In the example shown FIG. 3, the arms 36 and 38, in their central part, comprise a flat part 64, 66 respectively, cooperating with a suitable shape at the end of arms 50, 54 and enabling the pins 36, 38 to be secured in rotation with arms 50, 54.

In the example shown, the travel pathway 4 is advantageously formed of a plate 70 extending from the feed device as far as the flap. The plate 70, at its upper end 72, also comprises a bevelled element 74 which reduces the falling distance of the pellets from the feed means onto the plate 70. The plate may also be made in a shock absorbing material such as an elastomer.

In the example shown, the gates 18, 20, 22, are fixed to pins 36, 34, 38 respectively by means of screws for their easy replacement. With respect to the arms 36, 38, the gates 18, 22 are fixed at the central flat part 64, 66.

The flap 14 is of substantially rectangular shape and, as is described above, is fixed by an upper end 76 to the lower end 12 of the travel pathway 4, in particular to plate 70. The flap is advantageously fixed using a screw system, also for the purpose of its easy replacement.

Provision is also advantageously made so that the loading device comprises means to move the sintering boat relative to the loading chute, in particular relative to the lower end of the loading chute, to allow homogeneous distribution of the pellets in the form of layers in particular. For example, the sintering boat can be arranged on a conveyor belt or rollers; and this conveyor belt or these rollers are actuated in association with the stage of progress reached in loading the sintering boat, for uniform distribution of the pellets in the sintering boat.

As described previously, the loading chute may have several vertical positions, and for this purpose it is movable in rotation about an axis X, which allows the lower end of the loading chute to be positioned closest to the point at which a pellet is to be arranged in the sintering boat.

Provision may therefore be made to modify the lower position of the loading chute when one or more layers of pellets have been deposited in the sintering boat.

A description will now be given of the loading of a sintering boat using the loading device of the present invention.

The pellets are brought to the input of the loading chute by at least one conveyor; when being conveyed, quality controls can be carried out. The pellets are then discharged on the first level I, then the cylinder is actuated causing gate 18 to pivot and open and gate 20 to close, after which the pellet moves from level I to level II. Next, the cylinder is again actuated to open gate 20, and gate 18 closes simultaneously as does gate 22; the pellet comes to lie at level III. Then the cylinder is further actuated to close gate 20 and open gate 22; the pellet then comes to lie at level IV, slides over the flap and into the sintering boat:

The travel pathway has just been described for the first pellet placed in the loading chute, after which other pellets are brought by the conveyor 1 and are arranged at the first level; the pellets then follow after one another at the different levels and loading of the sintering boat takes place continuously.

Advantageously, according to the present invention, only a single pellet or a single row of pellets is contained at the different levels, which avoids impacts between pellets.

A loading method will now be described which uses the device of the present invention.

The loading method according to the present invention comprises the steps of:
  positioning the lower end of the loading chute in close position to the bottom of the sintering boat,
  feeding the loading chute with pellets,
  actuating the gates alternately,
  lifting the lower end of the loading chute in relation to the thickness of the pellets arranged in the sintering boat.

This method will now be described in more detail.

When a sintering boat is ready to be filled, the loading chute is lowered so that its lower end is placed close to the bottom of the sintering boat; the flap is also placed in the sintering boat.

Then the pellet conveying means are actuated to feed the loading chute, one pellet or a row of pellets being brought at the same time.

Advantageously, the sintering boat is moved during loading to ensure loading substantially in layers, a layer having the thickness of one pellet.

When a layer is completed, the sintering boat returns to its initial position to allow the depositing of another layer. The end of the loading chute may or may not be lifted depending on the determined loading mode.

Loading of a sintering boat can follow the following procedure. The pellets may be distributed in six layers in the sintering boat. For this purpose, a minimal position of the lower end of the loading chute is provided in order to arrange the first layer of pellets, then a second position higher than the first position to arrange a second layer of pellets, then a third position higher than the second position to arrange two layers of pellets, and finally a fourth position higher than the third position to deposit another two layers of pellets.

It is also possible, depending on the size of the sintering boats, to provide for more than six layers or less than six layers, and it is also possible to determine positions of the lower end of the loading chute for each of the layers or for more layers.

The invention claimed is:

1. Device to load a sintering boat with nuclear fuel pellets, comprising a loading chute delimiting a travel pathway for the pellets, the loading chute having an upper end intended to receive pellets and a lower end intended to lie close to a sintering boat, said loading chute comprising gates forming an obstacle in the travel pathway of the pellets so as to fractionate said pathway, said gates able to be opened and closed alternately, and the lower end of the loading chute being movable so that it can be drawn close to and away from a bottom part of the sintering boat, said gates including at least a first gate, a second gate and a third gate located one behind the other and aligned with the travel pathway, wherein the first and the third gates are simultaneously in an open or closed position, and the second gate is in a closed or open position, respectively.

2. Device according to claim 1, wherein the gates can be actuated alternately.

3. Device according to claim 1, comprising a single actuator for said gates.

4. Device according to claim 1, the opening (closing) of the second gate causing the closing (opening) of the first and third gates.

5. Device according to claim 3, wherein the actuator comprises a cylinder linked to the second gate by connecting rod means.

6. Device according to claim 4, wherein the actuator comprises a cylinder linked to the second gate by connecting rod means.

7. Device according to claim 5, wherein the first and third gates are connected via a coupling bar and one of either the first gate or third gate is connected via gear means to the second gate.

8. Device according to claim 6, wherein the first and third gates are connected via a coupling bar and one of either the upper gate or third gate is connected via gear to the second gate.

9. Device according to claim 1, wherein the gates are of substantially rectangular shape and comprise fringes on the side of a bottom part of the loading chute.

10. Device according to claim 1, wherein the gates are made in polyurethane.

11. Device according to claim 1, comprising a flexible flap at the lower end of the loading chute.

12. Device according to claim 11, wherein the flap is made in a silicone material.

13. Device according to claim 1, further comprising a pellet feed means which is a conveyor belt.

14. Device according to claim 1, comprising means to move the sintering boat relative to the lower end of the loading chute.

15. Loading method using a device to load a sintering boat with nuclear fuel pellets comprising a loading chute delimiting a travel pathway for the pellets, the loading chute having an upper end intended to receive pellets and a lower end intended to lie close to a sintering boat, said loading chute comprising gates forming an obstacle in the travel pathway of the pellets so as to fractionate said pathway, said gates able to be opened and closed alternately, and the lower end of the loading chute being movable so that it can be drawn close to and away from a bottom part of the sintering boat, said gates including at least a first gate, a second gate and a third gate located one behind the other and aligned with the travel pathway, wherein the first and the third gates are simultaneously in an open or closed position, and the second gate is in a closed or open position, respectively, and the device further including a pellet feed means, the loading method, consisting of:

- positioning the lower end of the loading head close to the bottom part of the sintering boat,
- setting in operation the pellet feed means,
- actuating the gates alternately,
- lifting the lower end of the loading chute in relation to the thickness of the pellets arranged in the sintering boat.

16. Method according to claim 15, wherein the sintering boat is moved during loading so as to ensure loading substantially in layers.

17. Method according to claim 15, wherein

- a first layer of pellets is deposited with the lower end of the loading chute at a minimal position,
- a second layer of pellets is deposited at a position higher than the minimal position,
- a third and fourth layer are deposited at an even higher position,
- a fifth and sixth layer are deposited at an even higher position.

18. Method according to claim 16, wherein:

- a first layer of pellets is deposited with the lower end of the loading chute at a minimal position,
- a second layer of pellets is deposited at a position higher than the minimal position,
- a third and fourth layer are deposited at an even higher position, a fifth and sixth layer are deposited at an even higher position.

* * * * *